US012752662B2

(12) United States Patent
Holcomb et al.

(10) Patent No.: US 12,752,662 B2
(45) Date of Patent: Oct. 6, 2026

(54) STANDARDIZED MANAGEMENT OF DISTRIBUTED ENERGY RESOURCES

(71) Applicant: PowerFlex Systems, LLC, San Diego, CA (US)

(72) Inventors: Chad Holcomb, Salt Lake City, UT (US); Zachary Jordan Lee, Pasadena, CA (US); So Trinh, Daly City, CA (US); Kodie Nathaniel Toro, San Mateo, CA (US); Yazid Mazahreh, San Mateo, CA (US)

(73) Assignee: PowerFlex Systems, LLC, San Diego, CA (US)

( * ) Notice: Subject to any disclaimer, the term of this patent is extended or adjusted under 35 U.S.C. 154(b) by 571 days.

(21) Appl. No.: 18/357,125

(22) Filed: Jul. 23, 2023

(65) Prior Publication Data

US 2024/0174116 A1 May 30, 2024

Related U.S. Application Data

(60) Provisional application No. 63/385,599, filed on Nov. 30, 2022.

(51) Int. Cl.
*B60L 53/68* (2019.01)
*B60L 53/66* (2019.01)
*H04L 69/18* (2022.01)
*G06Q 20/08* (2012.01)

(52) U.S. Cl.
CPC ............. *B60L 53/68* (2019.02); *B60L 53/665* (2019.02); *H04L 69/18* (2013.01); *G06Q 20/085* (2013.01)

(58) Field of Classification Search
CPC ........ B60L 53/68; B60L 53/665; B60L 53/65; B60L 53/66; B60L 58/12; H04L 69/18; H04L 67/12; G06Q 20/085; G06Q 20/145; G07F 15/005
See application file for complete search history.

(56) References Cited

U.S. PATENT DOCUMENTS

2019/0366831 A1* 12/2019 Cafeo ........................ H02J 7/47
2020/0254896 A1* 8/2020 Lee .......................... B60L 53/68
2022/0258639 A1* 8/2022 Hanchett ................. B60L 53/68
2023/0182601 A1* 6/2023 Kothari ................... B60L 53/14 320/109
2023/0322116 A1* 10/2023 Mies ....................... B60L 53/66 320/109

* cited by examiner

*Primary Examiner* — Seung H Lee
(74) *Attorney, Agent, or Firm* — Dinsmore & Shohl LLP

(57) ABSTRACT

Certain aspects of the present disclosure provide techniques for system for providing an electric vehicle (EV) computing platform that includes an edge environment located at a site that causes the system to perform actions that include receiving first charge data from the edge gateway in a first communication protocol, receiving second charge data from the edge gateway in a second communication protocol, and converting the first charge data and the second charge data into a common protocol. The actions further including creating a first session entry for the first charge session and a second session entry for the second charge session and solving a charge curve associated with the first charge session and the second charge session to determine a first charge to the first energy asset for usage of the first charging station and a second charge of the second energy asset for usage of the second charging station.

20 Claims, 9 Drawing Sheets

STANDARDIZED MANAGEMENT OF DISTRIBUTED ENERGY RESOURCES

CROSS REFERENCE

This application claims the benefit of U.S. Provisional Application Ser. No. 63/385,599, filed on Nov. 30, 2022, which is hereby incorporated by reference in its entirety.

INTRODUCTION

Aspects of the present disclosure relate to a scalable edge hardware system for distributed energy resources.

Electric vehicles (EVs), including plug-in hybrid and fully electric vehicles, are increasing in popularity around the world. It is expected that the proportion of new EVs sold each year out of the total number of vehicles sold will continue to rise for the foreseeable future. Moreover, while EV operators are primarily non-commercial (e.g., personal vehicles), commercial vehicle operators are increasingly adding EVs to their fleets for all sorts of commercial operations, thus adding to the number of EVs in operation throughout the world.

The shift from internal combustion engine (ICE)-powered vehicles to EVs requires significant supporting infrastructure anywhere EVs are operated. For example, electric vehicle charging stations, sometimes referred to as electric vehicle supply equipment (EVSE), need to be widely distributed so that operators of EVs are able to traverse the existing roadways without issue.

Charging electric vehicles is different from refueling ICE vehicles in many ways. For example, an ICE vehicle simply purchases fuel at a fuel pump and the user either pays at the counter or the fuel pump is coupled with a credit card processing machine for receiving payment. EV charging is often tied to a user account such that payments may be processed remotely without the need for the user to take any action. With this added convenience introduces complexities in that different charging stations may utilize different communication and/or billing protocols that are not compatible with one another. Further, the EVs themselves may utilize different protocols, thus adding to the complexity.

Accordingly, there is a need for standardized management of distributed energy resources.

SUMMARY

Certain aspects of the present disclosure provide techniques for system for providing an electric vehicle (EV) computing platform that includes an edge environment located at a site that causes the system to perform actions that include receiving first charge data from the edge gateway in a first communication protocol, receiving second charge data from the edge gateway in a second communication protocol, and converting the first charge data and the second charge data into a common protocol. The actions further include creating a first session entry for the first charge session and a second session entry for the second charge session and solving a charge curve associated with the first charge session and the second charge session to determine a first charge to the first energy asset for usage of the first charging station and a second charge of the second energy asset for usage of the second charging station.

Embodiments of a method include receiving first charge data, the first charge data being sent in a first communication protocol from a first charging station at a site, the first charge data related to a first charge session for charging of first energy asset, receiving second charge data, the second charge data being sent in a second communication protocol from a second charging station, the second charge data related to a second charge session for charging a second energy asset, and converting the first charge data and the second charge data into a common protocol. In some embodiments, the method includes causing an edge cluster to create a first session entry for the first charge session and a second session entry for the second charge session, causing the edge cluster to send the first session entry and the second session entry to a cloud environment via a wide area network, and causing an edge session broker to receive at least a portion of the first session entry and the second session entry and communicate with a database server to access additional session data. Some embodiments are configured for causing the edge session broker to solve for a charge curve associated with the first charge session and the second charge session to determine a first charge to the first energy asset for usage of the first charging station and a second charge of the second energy asset for usage of the second charging station.

Embodiments of a non-transitory computer-readable medium are also provided. Some embodiments include logic that, when executed by a computing device, cause the computing device to perform actions, such as receiving first charge data, the first charge data being sent in a first communication protocol from a first charging station at a site, the first charge data related to a first charge session for charging a first energy asset, receiving second charge data, the second charge data being sent in a second communication protocol from a second charging station, the second charge data related to a second charge session for charging a second energy asset, and converting the first charge data and the second charge data into a common protocol. In some embodiments, the actions include causing an edge cluster to create a first session entry for the first charge session and a second session entry for the second charge session, causing the edge cluster to send the first session entry and the second session entry to a cloud environment via a wide area network, and causing an edge session broker to receive at least a portion of the first session entry and the second session entry and communicate with a database server to access additional session data. In some embodiments, the actions include causing the edge session broker to solve for a charge curve associated with the first charge session and the second charge session to determine a first charge to the first energy asset for usage of the first charging station and a second charge of the second energy asset for usage of the second charging station.

DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for standardized management of distributed energy resources. Some embodiments are configured to provide interoperability between distributed energy sources (DERs) for purposes of monitoring and control. Different vendors and manufacturers either create their own communication protocols or interpret standardized protocols differently. Embodiments provided herein standardize consumption of signals and management/controls onsite DERs. These embodiments may utilize a combination of open-source protocols and custom-built management controls to create a custom full-service energy management system. These embodiments may provide universal hardware compatibility, increased demand and load shifting capabilities, and centralized coordination of software updates that support increased functionality across managed sites and managed assets. The systems and methods for providing standardized management of distributed energy resources incorporating the same will be described in more detail, below.

Example Computing Environment for Providing an Edge Hardware Platform

Figure 1:
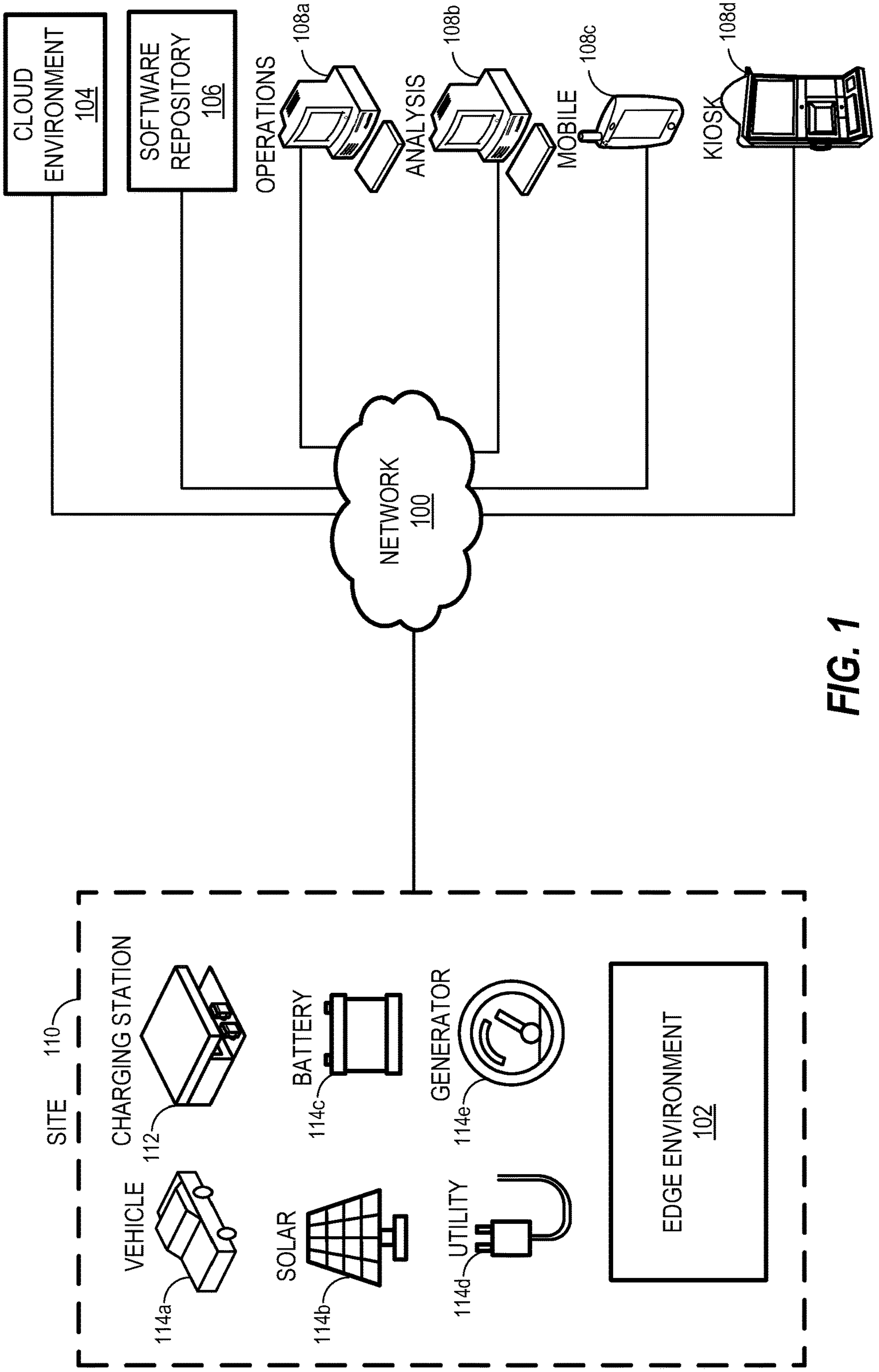
FIG. 1 depicts a computing environment for providing standardized management of distributed energy resources, according to embodiments provided herein.

Referring now to the drawings, FIG. 1 depicts a computing environment for providing an edge hardware platform according to embodiments provided herein. As illustrated, the computing environment includes a network 100 that is coupled to an edge environment 102, a cloud environment 104, a software repository 106, as well as ancillary devices 108. The network 100 may be configured as any wide area network (WAN, such as the internet, power network, cellular network, etc.) or other network for facilitating communication among the edge environment 102, the cloud environment 104, the software repository 106 and ancillary devices 108.

Edge environment 102 may generally be deployed at site 110 to provide various services, including coordination and optimization of energy assets 114, such as charging of vehicles such as electric vehicles (EVs) (e.g., EV 114*a*, depicted as "VEHICLE") using charging station 112 and various distributed energy sources (DERs), such as solar device 114*b*, battery energy storage system (BESS) 114*c* (depicted as "BATTERY"), utility 114*d* (e.g., utility grid connection), and generator 114*e* (e.g., an onsite diesel, natural gas, or other type of fueled generator). Generally, the aforementioned DERs may provide energy to the charging station 112 and/or use energy from the charging station 112 (e.g., by way of a backflow of energy from EV 114*a* to other aspects of site 110). In some embodiments, charging station 112 may send excess energy back to the BESS 114*c* and/or to utility 114*d*. Generally, edge environment 102 may monitor and/or modify the energy sent to and received from the DERs to optimize various tasks, such as charging of EV 114*a*.

Charging station 112 may utilize various communication protocols, such as open smart charging protocol (OSCP), open charge point interface (OCPI), ISO 15118, OpenADR, etc. and may represent Level 1, Level 2, Level 3, and higher level charging stations, as applicable. Generally, the "level" of a charging station refers to the power level and/or ability to provide electric power to a device being charged.

Edge environment 102 is configured as an interface between various aspects of site 110 and network 100. In various embodiments, compute resources for performing different functions at a site, such as optimization of EV charging, may be split between local compute resources in edge environment 102 and remote compute resources, e.g., in cloud environment 104 of FIG. 1.

Cloud environment 104 is coupled to the edge environment 102 via the network 100 and may be configured for further processing of data, as described herein. While FIG. 1 depicts a single cloud environment 104 that serves a single edge environment 102, this is merely an example, as some embodiments may be configured such that the cloud environment 104 may serve a plurality of edge environments 102 that each serve one or more sites 110, one or more charging stations 112, one or more DERs, and the like.

Software repository 106 is also coupled to site 110 via network 100. Software repository 106 may be configured as a platform to program, store, manage, control changes, etc. to software that is implemented in edge environment 102 and/or cloud environment 104. In some embodiments, software repository 106 may be configured as a proprietary service and/or may be provided by a third-party, such as GitHub™. Additionally, some embodiments may be configured such that the software repository 106 is provided by the same entity that manages the cloud environment 104. As such, these embodiments may be configured such that software repository 106 and cloud environment 104 may be combined.

Also depicted in FIG. 1 are the ancillary devices 108. The ancillary devices 108 may include an operations device 108*a*, an analysis device 108*b*, a mobile device 108*c*, a kiosk 108*d*, and/or other devices. Specifically, the operations device 108*a* may be utilized to monitor and/or alter operations of the environment provided in FIG. 1. The analysis device 108*b* may analyze utilization, operation, charging, and/or other features of the computing environment. The mobile device 108*c* may represent an administrator device and/or a user device. As a user device, the mobile device 108*c* may initiate charging, payment, and/or perform other user-specific actions. As an administrator device, the mobile device 108*c* may perform administrative operations, analysis, and/or perform other actions. The kiosk 108*d* may be located at one of the charging stations 112 and/or remote therefrom and may provide user-specific or administrative actions, similar to that of the mobile device 108*c*. In some embodiments, administrators may use the kiosk 108*d* to view information about the site or make changes. As will be understood, the ancillary devices 108 may each include a processor, a memory component, and/or other hardware and/or software for preforming the functionality provided herein. It should be understood that while the kiosk 108*d* is depicted as being remote from the site 110, some embodiments may not be configured in this manner. Specifically, some embodiments may utilize a local kiosk 108*d*, which may communicate via a local network and/or the network 100 for providing the services described herein.

Example Aspects of an Edge Environment

Figure 2:
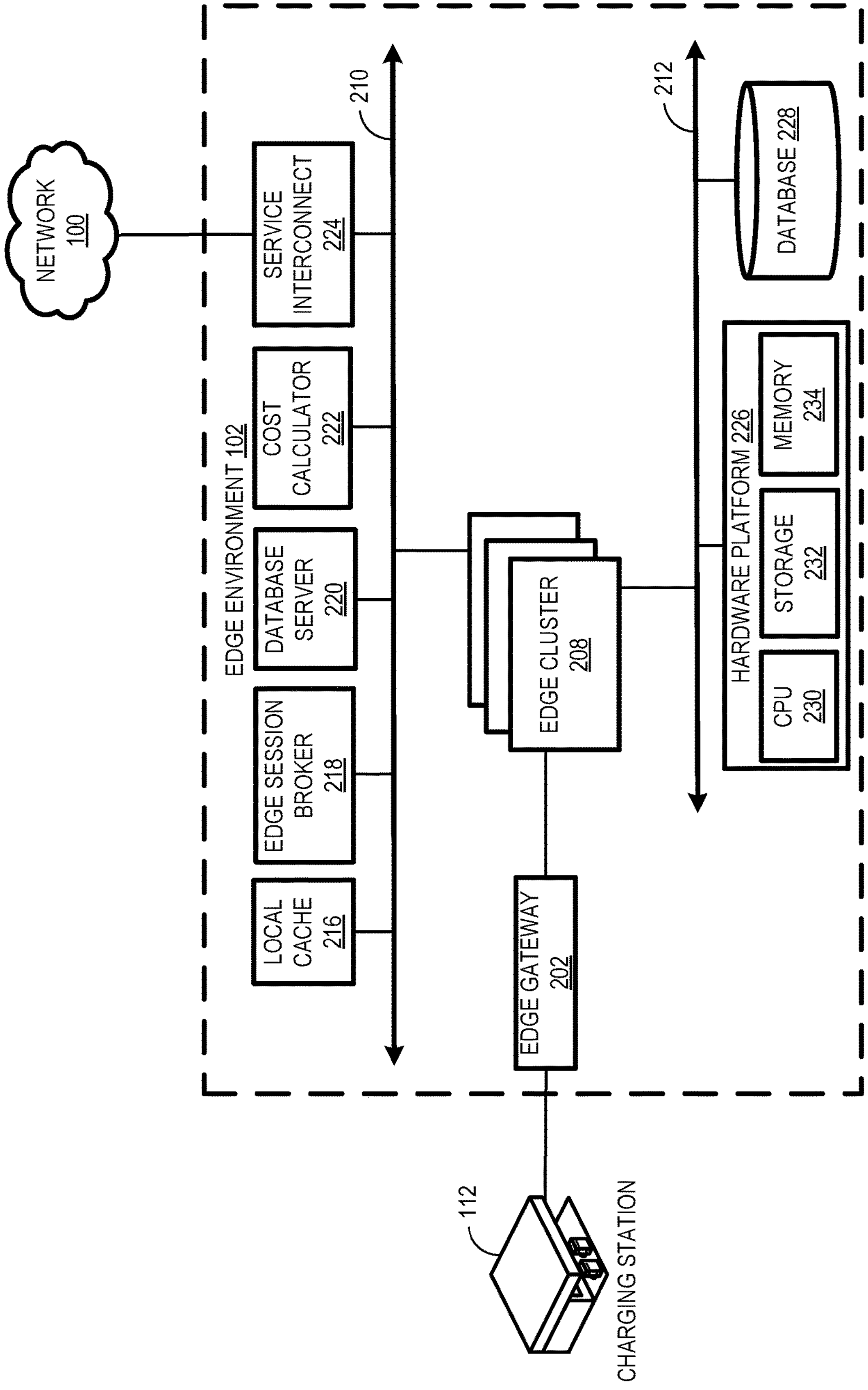
FIG. 2 depicts a software configuration for an edge environment, according to embodiments provided herein.

FIG. 2 depicts a software configuration for an edge environment, according to embodiments provided herein. Edge environment 102 may be operatively coupled to aspects of site 110, such as charging station 112 via edge gateway 202. Edge environment 102 further includes an edge cluster 208, which is coupled to communication bus 210 and hardware bus 212. Communication bus 210 is coupled to local cache 216, edge session broker 218, database server 220, cost calculator 222, and service interconnect 224 in this example. Hardware bus 212 is further coupled to hardware platform 226, which may include one or more processors, such as CPU 230, storage component 232, memory component 234, and/or other hardware components. Also coupled to hardware bus 212 is database 228.

Buses 210, 212 may be utilized to facilitate operation of all services that run in edge environment 102 and communicate with each other via a distributed message streaming system. The coupling of these aforementioned services 208-228 may be accomplished in one aspect via a distributed message streaming system, such as NATS.

In the depicted example, charging station 112 is configured for communication with edge environment 102 via edge gateway 202 via a short-range wireless network technology, such as via a ZigBee® PAN. The edge gateway 202 may be configured to receive data, such as electric charging data, price charge data, vehicle data, etc. from the charging station 112 and/or vehicles that are being charged via the connection with the site 110 (of FIG. 1).

In some embodiments, edge gateway 202 may be configured to abstract data received from aspects of site 110 (of FIG. 1), such as charging station 112, to remove protocol-specific distinctions. For example, a first charging station may utilize a first communication protocol and/or billing protocol and a second charging station may utilize a second communication protocol and/or billing protocol. Edge gateway 202 may receive data packets from both the first charging station using the first communication protocol and the second charging station using the second communication protocol and may transform the received data into a protocol-agnostic format prior to providing the data to edge cluster 208. This allows wide interoperability between edge environment 102 and various types of hardware (e.g., charging station 112) at a site.

Edge cluster 208 is the central message center in various embodiments. For example, when a user plugs a vehicle into a charging station 112, edge cluster 208 receives data from edge gateway 202, parses that data (e.g., to generate access state data) and causes the state data to be sent to the database server 220. Edge cluster 208 also receives the data and creates a session entry, which may be stored in the local cache 216. Edge cluster 208 may additionally send the session entry to the cloud environment 104 (of FIG. 1) via network 100. Edge session broker 218 may also receive data related to the new session and may query database server 220 to access additional session data to determine charging characteristics for charging station 112.

Edge session broker 218 may be configured to produce data or signals that are sent to the edge cluster 208, which may then be sent to charging station 112 via edge gateway 202. The data or signals may indicate, for example, current delivered over time (e.g., amperes), total energy delivered (e.g., kWh), power delivered over time (e.g., kW), voltage at the charging station over time (e.g., V), charging station state (e.g., connected, disconnect, offline). Charging stations 112 may report any errors back to edge cluster 208 via edge gateway 202.

Cost calculator 222 is configured to access pricing data from cloud environment 104 (of FIG. 1) and may calculate costs incurred based on delivered energy, expected costs prior to charging, idle time interval, parking time interval, etc. An asset interface may also be coupled to communication bus 210 and may act as an interface between edge environment 102 and various DERs, such as described above with respect to FIG. 1.

Edge cluster 208 may be configured such that any message received by the edge cluster 208 may also be sent to the cloud environment 104 (of FIG. 1) for consumption by a data subscriber in the cloud environment 104. For example, if a user of the mobile device **108*c* (in FIG. 1) desires to claim a charging session, mobile device 108*c* does not need to access edge environment 102 directly. Instead, mobile device 108*c* may connect with the cloud environment 104 (of FIG. 1), which sends a message to the edge cluster 208 with an instruction to claim the session. Service interconnect 224 is configured for establishing an HTTP, TCP, and/or other type of communication with the cloud environment 104 (of FIG. 1) via network 100**.

Hardware platform 226 represents any hardware for facilitating the processes and actions described herein. Specifically, CPU 230 may represent one or more types of processing device configured for executing instructions. Storage component 232 may be configured as long term storage, such as a hard drive or the like. Memory component 234 may include any of various types or read access memory or the like. Database 228 may be configured for additional storage and may be housed with the other hardware and/or elsewhere. Examples of different hardware platforms that may be deployed in edge environment 102 are described further below with respect to FIGS. 4A-4C.

Hardware Configurations for Edge Environment

Figure 3A:
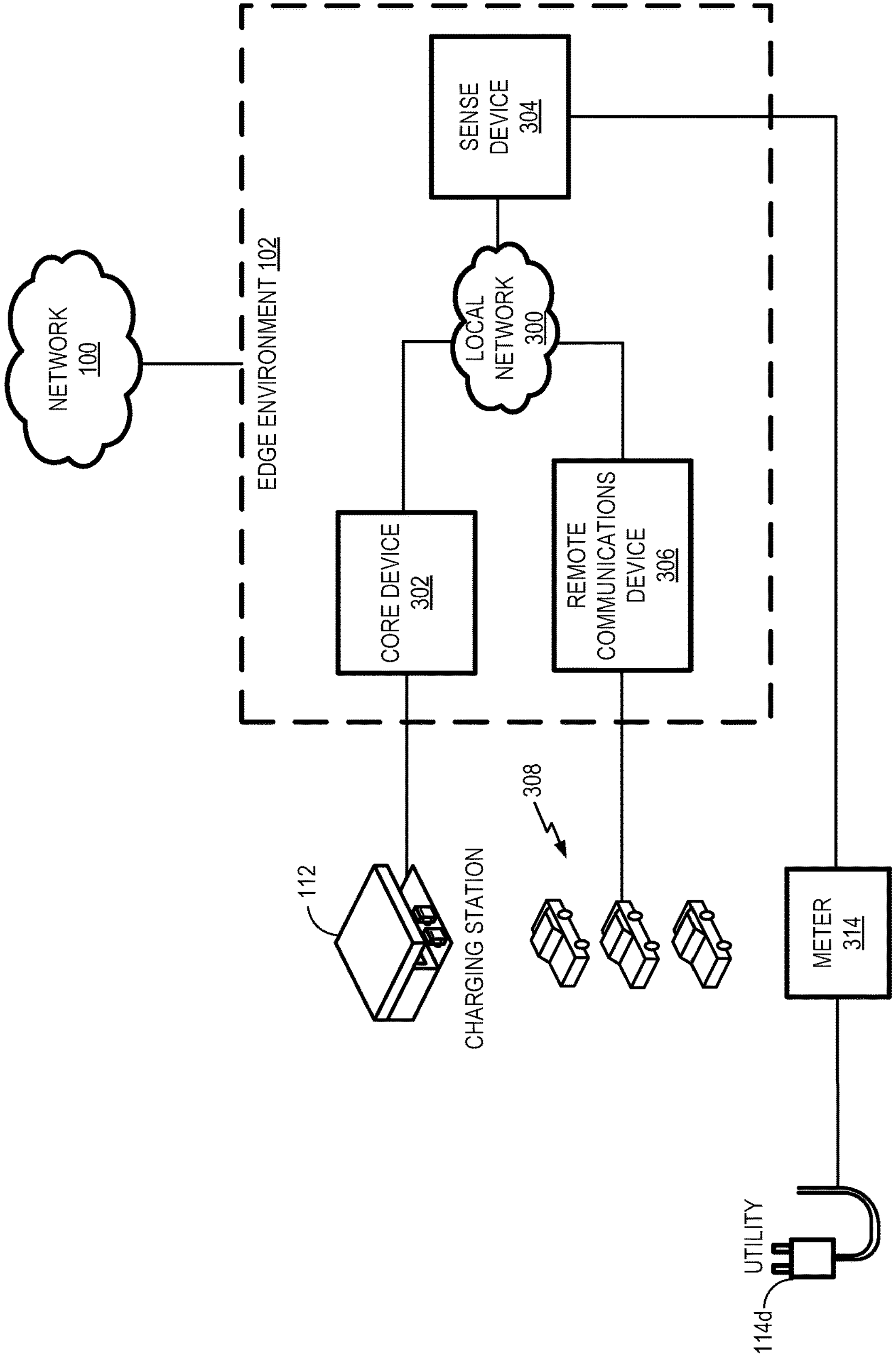
FIGS. 3A-3C depict device configurations for the edge environment, according to embodiments provided herein.
Figure 3B:
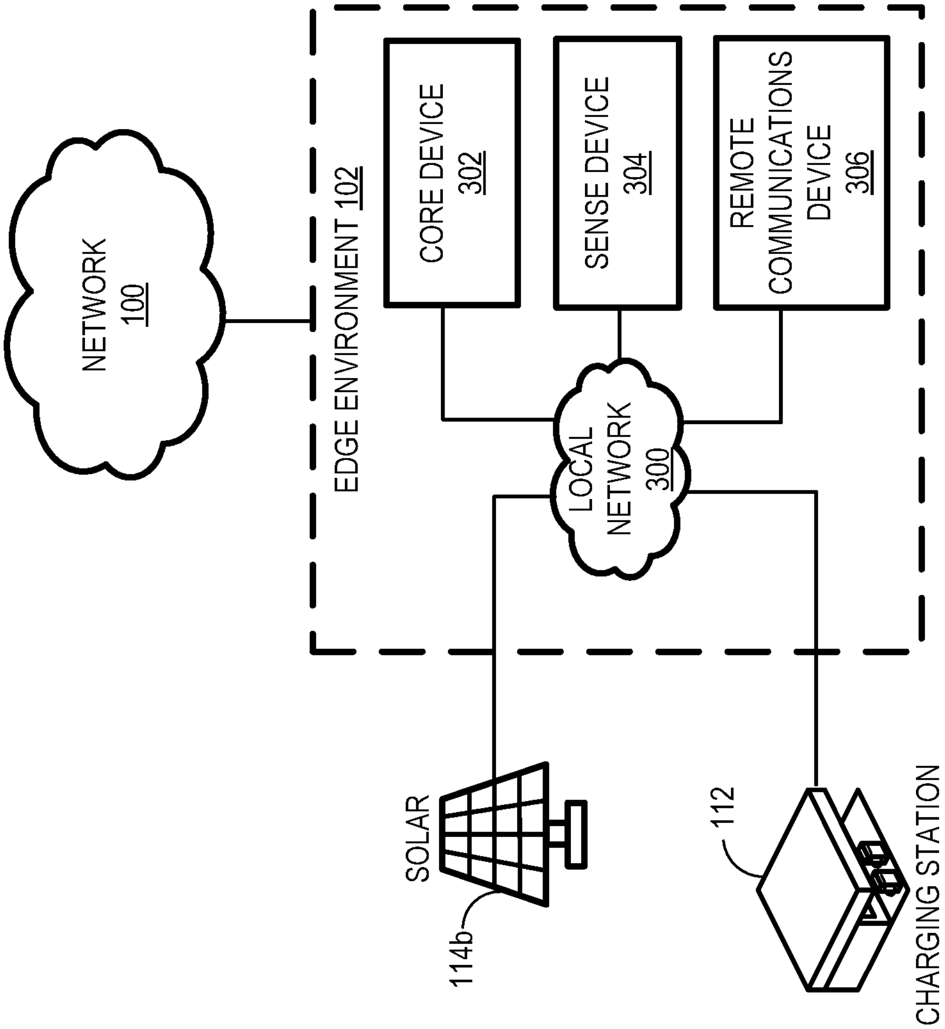
Figure 3C:
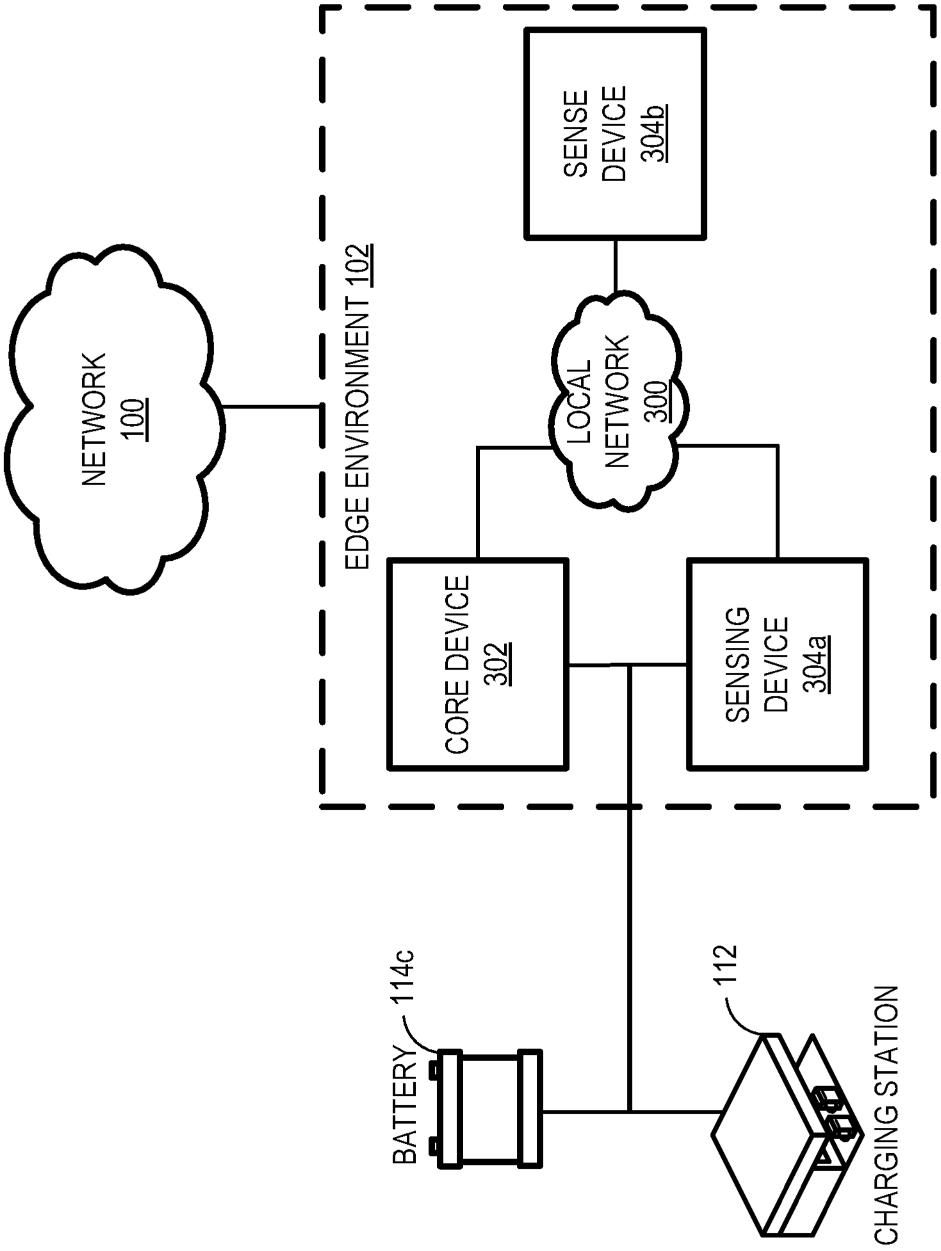

FIGS. 3A-3C depict example hardware configurations for the edge environment 102, according to embodiments provided herein. Specifically, FIG. 3A depicts a charging solution. As illustrated, the charging station 112 is coupled to a local network 300 via core device 302. The local network 300 may include any local area network, Ethernet, PAN, etc. The core device 302 may be physically installed within communications range of the chargers in the charging station 112. A sense device 304 may be installed, for example, in an electrical room or in another enclosure with electrical equipment of the charging station 112 and/or one or more energy assets 114 to monitor the main metering point for the local utility point of common coupling. This enables algorithms to provide the optimal dispatch of EV charging power, subject to local energy rates and the vehicles currently charging. In the case that there are vehicles 308 using EV chargers that out of communications range of the core device 302, such as a sub-level of a parking garage, a remote communications device 306 are included as required. Also included at the site 110 is a meter 314 for communicating energy with the utility **114*d***.

In FIG. 3A, the core device 302 is the central processing device and serves as the communications hub. The core device 302 may provide optimization, load management, communication coordination, and data historian services. The core device 302 communicates with the cloud environment 104 via cellular modem, wired internet service provider (ISP), and/or other communications medium to get current optimization and load management set points for charging stations 112 and other assets, such as via an optimization algorithm that may be stored locally and/or at the cloud environment 104. It will be understood however, that some embodiments may be configured such that the core device 302 performs optimization locally. Regardless, the core device 302 dispatches these set points, through a local communications protocol (e.g., Wi-Fi) and/or via the remote communications device 306 to reach locations that are distant or hard to reach, such as charging stations with a core device 302 and/or sense device 304 at sub-levels of a parking garage or a rooftop solar inverter. The core device 302 additionally collects data directly from distributed energy resources and power measurement devices or through cloud-based communications with the network 100.

Power and energy metering data may be collected via the sense device 304. The sense device 304 may include a smart meter with support for multiple single- and three-phase loads with a local historian and Ethernet communication back to the device via the local network 300. The sensing device may also incorporate support for additional devices running on the edge including but not limited to thermocouple wiring, weather stations, temperature sensors, pyranometers, etc. It should be noted that additional sense devices 304 and remote communication devices 306 can be added to handle a variety of situations, such as a separate subpanel for energy metering of a new solar or for monitoring of a new inverter associated with a rooftop solar installation.

FIG. 3B depicts a solar application where the core device 302 and the sense device 304 are installed in the facility's electrical room or other common area. The sense device 304 can monitor the main metering point for the local utility as well as the solar production at tie-in breakers for the solar device 114*b*. The remote communications device 306 may be installed in a position to communicate directly with the solar device 114*b* and report the data received from the solar device 114*b* to the core device 302. Accordingly, the core device 302, the sense device 304, and the remote communications device 306 depicted in FIG. 3B may perform similar functions as those devices depicted in FIG. 3A.

FIG. 3C depicts a battery application where the core device 302 and the sense device 304 are physically installed near a BESS 114*c* storage installation. In cases where the BESS 114*c* is near the point of common coupling with the utility 114*d*, a single sense device 304*a* can monitor the full site. In cases where there is a significant distance to the metering point for the utility 114*d*, a second sense device 304*b* (or a plurality of sense devices 304*b*) may be installed near the utility meter, such as the electrical room.

Hardware Components in Core, Sense, and Remote

Figure 4A:
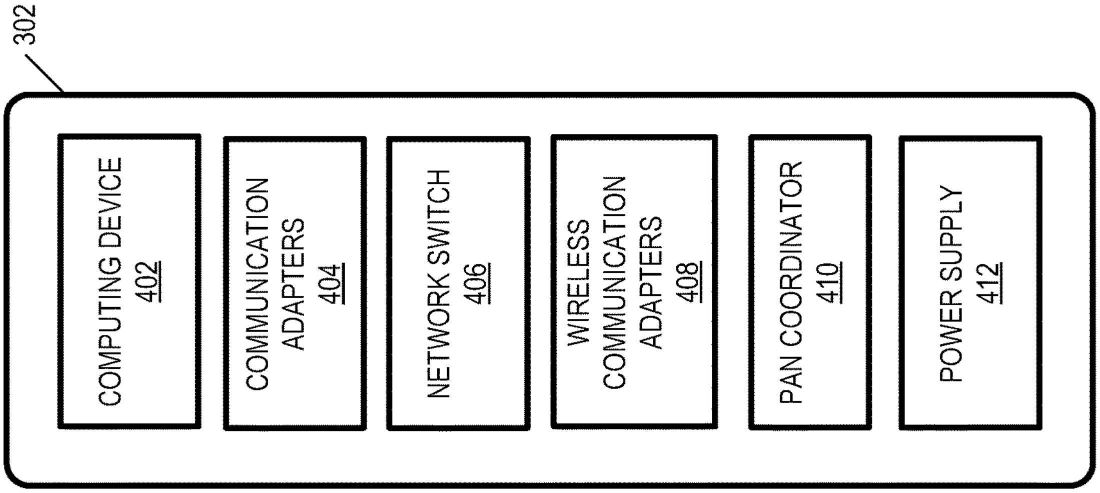
FIGS. 4A-4C depict hardware that may be utilized for the devices from FIGS. 3A-3C, according to embodiments provided herein.
Figure 4B:
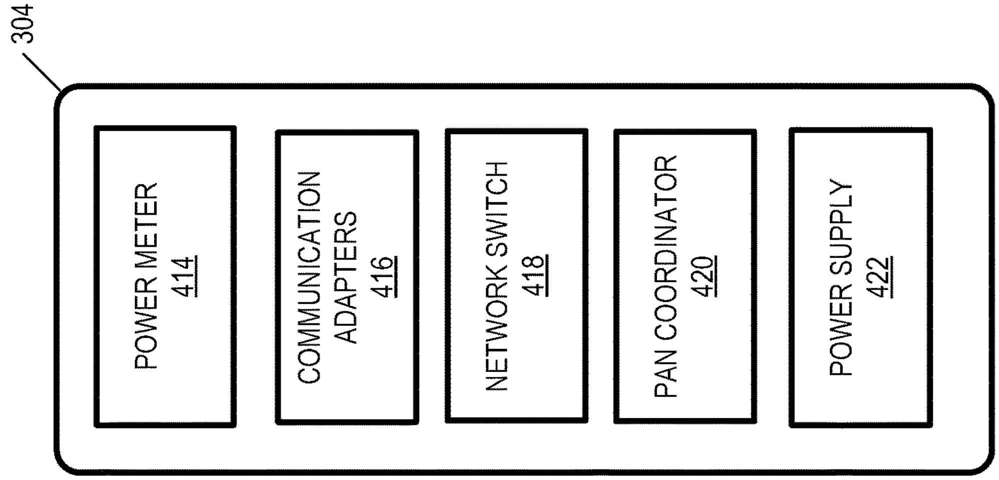
Figure 4C:
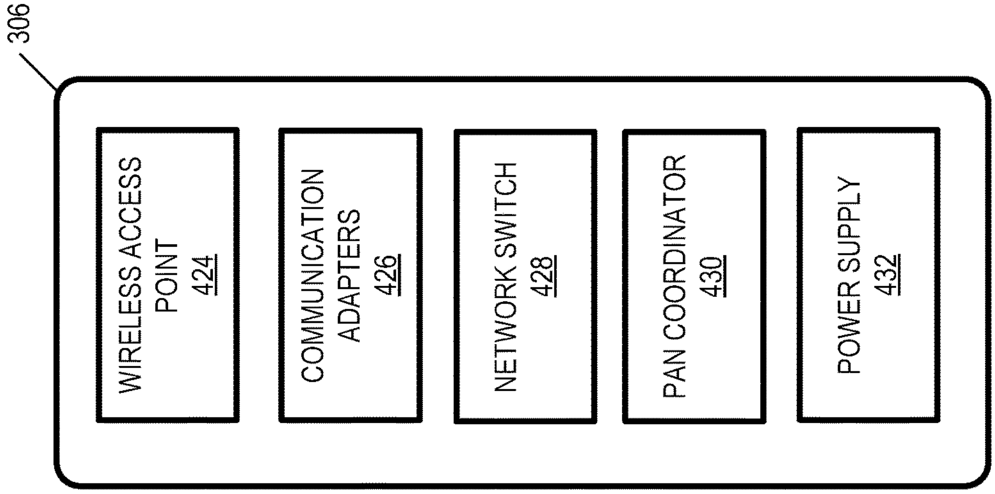

FIGS. 4A-4C depict hardware that may be utilized for the devices from FIGS. 3A-3C, according to embodiments provided herein. Specifically, FIG. 4A depicts hardware components that may be present in a core device 302. In some embodiments, the core device 302 is the "brain" where the energy optimization and adaptive load management functions are executed and dispatched. As illustrated, the core device 302 may include a computing device 402, a communication adapter 404 (or more than one), a network switch 406, a wireless communication adapter 408, a PAN coordinator 410 (e.g., a short-range network or other PAN coordinator), and a power supply 412. As will be understood, the computing device may include a processor, memory, and/or other components that a normal, specific purpose machine may utilize. In some embodiments, the computing device 402 may include powerline communication (PLC) infrastructure, while some embodiments may utilize retail and/or micro-industrial computer components for optimization, load management, communication coordination, and/or historian services.

The communication adapter 404 may be configured to convert between various communication protocols and/or media, such as Modubus RTU (RS485) to Modbus TCP (Ethernet) or Ethernet IP (RJ45) to Ethernet Optical (SFP), etc. The network switch 406 may be configured for routing of network traffic, and may be configured as an Ethernet switch for communication to other nodes (e.g., the sense device 304, the remote communications device 306, and/or other core device 302), distributed energy resources, and/or energy based management systems.

The wireless communication adapter 408 may include a cellular modem, internet modem, Wi-Fi access point, etc. for facilitating wireless communications to the internet or other wide area network. Similarly, the PAN coordinator 410 may be configured to create and/or join communication connections with other devices. This may include a ZigBee® coordinator, Bluetooth device, and/or other device for performing this function. The power supply 412 may be configured as a battery power, connection to external power, etc.

Similarly, some embodiments may be configured such that the core device 302 determines that the core device 302 is communicatively disconnected from the network 100. Accordingly, the core device may be configured to store data and direct operation of the charging station 112 via the stored data until communication is restored to the network 100.

Some embodiments may be configured with a plurality of charging stations 112 that utilize different communication protocols, billing protocols, etc. In these embodiments, the core device 302 may be configured to communicate with a first charging station via a first protocol and a second charging station via a second protocol, such as via the edge gateway 202 (FIG. 2).

In some embodiments, the core device 302 may be configured to sense a grid power failure (e.g., from the utility 114*d*) and change modes based on the grid power failure. The mode change may include utilizing a different power source (e.g., solar device 114*b*, BESS 114*c*, generator 114*e*, etc.), rationing energy, etc.

In some embodiments, the core device 302 may receive telematics data from an EV 114*a* at the charging station 112 and may be configured to utilize the telematics data for optimization.

It should be understood that in some embodiments, the computing device 402 may be embodied as the depiction of the edge environment 102 from FIG. 2. Specifically, the core device 302 may be configured as the central computing device of the edge environment and thus may provide the processing and workflow described with reference to FIG. 2. Some embodiments are not so limited.

FIG. 4B depicts hardware components of the sense device 304 from FIGS. 3A-3C. The sense device 304 may be configured as a smart-metering component for collection and storage of energy asset data, including but not limited to measurements such as temperature, voltage, current, power, solar irradiance, wind speed, etc. The sense device 304 may include a smart meter with a plurality of channels of measurement that may comprise single-phase circuits and/or three-phase circuits. The sense device 304 may communicate meter data back to the core device 302 from meter locations such as electrical rooms, rooftop solar installations, EV chargers, and subpanels. These embodiments may be optimized for ease of installation and reduced intrusion to the site. Power over Ethernet (POE) sourced from the core device 302 suffices for most installations. The sense device 304 may transmit data back to the core device 302 via a network switch 418 (e.g., a first network switch). While the sense device 304 may include a power supply 422, in some embodiments, the sense device 304 may optimized to utilize minimal power and utilize PoE for at least some applications.

As illustrated in FIG. 4B, the sense device 304 includes a power meter 414, a communication adapter 416, a network switch 418, and may include a PAN coordinator 420, and a power supply 422. The power supply 422 may include a power interface for providing power to the sense device 304. The power meter 414 may be utilized for monitoring single-phase and three-phase loads of power. The communication adapter 416 may be utilized for facilitating communications between the sense device 304 and other devices. In some embodiments, the network switch 418 may and/or sense device be a PoE enabled switch for communication. Similarly, the PAN coordinator 420 may create and/or join personal area networks, such as via Zigbee, Bluetooth, and the like.

As illustrated in FIG. 4C, the remote communications device 306 is a network-connectivity extension, primarily for EV charging or solar monitoring locations where Zigbee®, Wi-Fi, Ethernet, and/or other wireless communication signals are being extended to remote or difficult-to-reach locations such as remote subpanels, parking garage levels, or rooftop inverters. Some embodiments are optimized for ease of installation and reduced intrusion to the site where PoE suffices for most installations from the core device 302. The remote communications device 306 may be configured to transmit data back to the core device 302 via the network switch.

Specifically, the remote communications device 306 may include a wireless access point 424, a communication adapter 426, a network switch 428 (e.g., a second network switch), and may include a PAN coordinator 430, and a power supply 432. The wireless access point 424 may be configured to extend wireless communication signals to chargers and/or other intelligent electronic devices. The communication adapter 426 may be configured for facilitating communications between the remote communications device 306 and other devices. The network switch 428 may be configured as a PoE Ethernet switch and/or other network switch for communicating with the core device 302. The PAN coordinator 430 may be configured to create and/or join personal area networks, such as via Zigbee®, Bluetooth®, and the like. The power supply 432 may include a power interface for providing power to the sense device 304. It should be understood that while the remote communications device 306 is depicted with a power supply 432, this is one example. As described above, power to one or more components may be provided via a PoE Ethernet switch and/or via other mechanism.

It should be understood that the embodiments of FIGS. 4A-4C utilize PAN coordinators 410, 420, 430 in each of the core device 302, sense device 304, and remote communication device 306. As such, each of the PAN coordinators 410, 420, 430 utilize individual PAN networks, typically, at sites that have networks out of range of each other or too many devices for a single coordinator. Thus, the computing device 402 (and/or other computing device described herein) may be configured to manage all of the PAN coordinators 410, 420, 430, such as using a USB hub extension. Additionally, the cloud environment 104 keeps relationships of paired devices up to date for load management and dispatch.

Components of Cloud Environment

Figure 5:
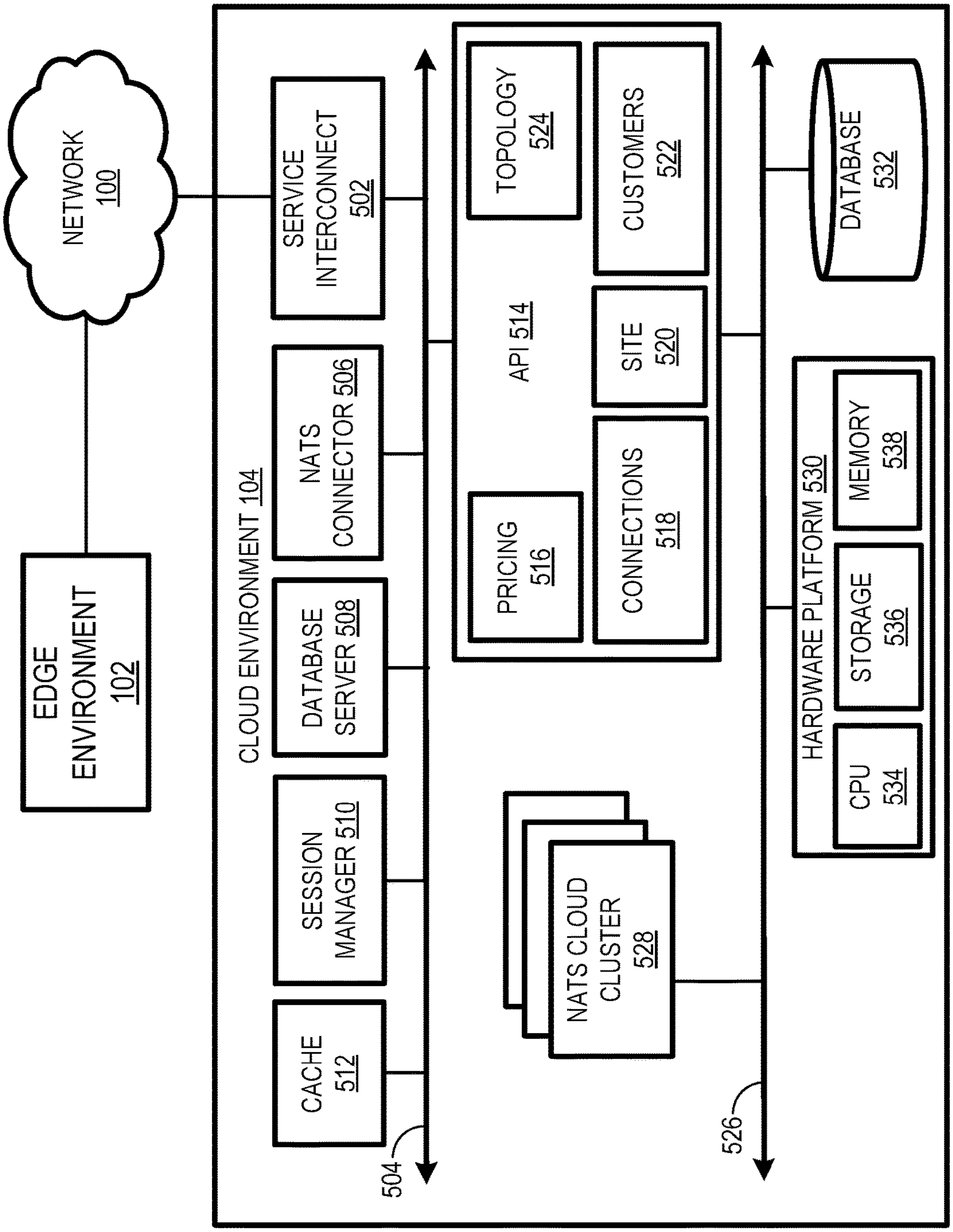
FIG. 5 depicts a cloud environment for standardized management of distributed energy resources, according to embodiments provided herein.

FIG. 5 depicts a cloud environment 104 for providing an edge hardware platform, according to embodiments provided herein. As illustrated, the network 100 may couple to the cloud environment 104 via a service interconnect 502 that corresponds with the service interconnect 224 from FIG. 2. Similar to the service interconnect 224 from FIG. 2, the service interconnect 502 may be configured to facilitate an HTTP, TPC, and/or other communication portal through the network 100 to the edge environment 102 for the exchange of data between the edge environment 102 and the cloud environment 104. The service interconnect 224 is also coupled to a communication bus 504, which facilitates communication among various components of FIG. 5. Also connected to the communication bus 504 are a connector 506 (which may be configured as a NATS connector or may use a different protocol), a database server 508, a session manager 510, a cache 512, and a collection of services and application programming interfaces (APIs) 514. The API 514 may include a pricing API 516, a connections API 518, a site API 520, a customer's API 522, and a topology API 524. The API 514 may be implemented by the hardware platform 530. The hardware bus 526 is coupled to a cloud cluster 528, as well as a hardware platform 530 and a database 532. The hardware platform 530 may include a CPU 534, a storage component 536, and a memory component 538.

The API 514 is a component of the cloud environment 104. As such, the API 514 and sub-components 516-524 may cause storage of and/or process site information, site topology, customers, connections to panels, constraints of panels, pricing information of each site, local forecasting services, optimization services, controller services, and caching services, etc. The API 514 may also serve as a mobile backend by storing personal information of charge users (e.g., email, charging preferences, payment preferences, privileges, access, fleet information, etc.). The API 514 may additionally store peak charging configurations, data related to meter setup, etc.

When a vehicle is plugged into a charging station 112 (FIG. 1), the edge session broker 218 (FIG. 2) communicates connection information to the API 514. The connection information may include vehicle information, user information, charge station information, etc. The API 514 then creates a charge session object, which is stored in the cache 512. The cache 512 sends the session data, along with topology constraints and the charge session object to the edge environment 102. The connector 506 may additionally cause the cloud cluster 528 (which may be configured as a NATS cloud cluster or other protocol) to maintain the charge session object for retrieval by an interested party. As the session continues, the session manager 510 may be utilized to alter constraints of the session, which may cause the cloud cluster 528 to update the charge session object.

When a user claims a previously created session with the mobile device 108*c* the database server 508 may create a database entry with the charge session, driver, along with energy request, willingness to pay, electricity purchased, etc. The connector 506 may update the cloud cluster 528 with the database entry. This data may then be sent to the edge environment 102. When the charge session ends (e.g., the vehicle is unplugged), that action will be added to the database entry and the database entry may be moved from a current sessions list to a completed sessions list.

As indicated above, the hardware platform 530 may represent hardware that may be utilized to execute the components described regarding FIG. 5. As such, the CPU 534 may be configured as any processing unit for receiving and executing computer-readable instructions. The storage component 536 may be configured as any hard drive or other local storage device. The memory component 538 may be configured as any type of RAM, ROM, registers, etc. or the like.

Process for Solving a Charge Curve for a Plurality of Charge Sessions

Figure 6:
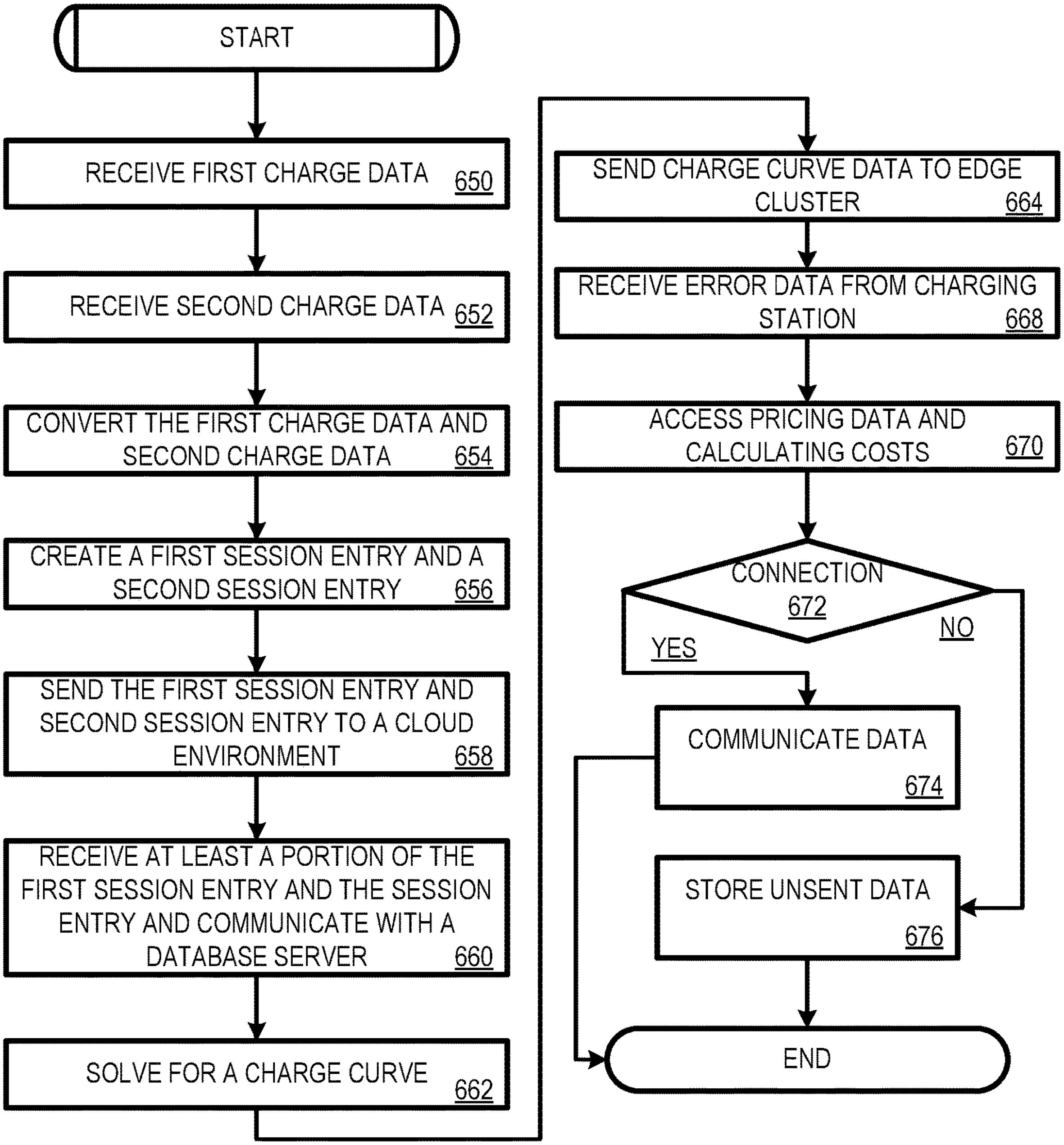
FIG. 6 depicts a flowchart for standardized management of distributed energy resources across a plurality of protocols, according to embodiments provided herein.

FIG. 6 depicts a flowchart for providing standardized management of distributed energy resources, according to embodiments provided herein. As illustrated in block 650, first charge data may be received in a first communication protocol from a first charging station 112 at the site 110, the first charge data related to a first charge session for charging a first energy asset 114. In block 652, second charge data may be received in a second communication protocol from a second charging station 112, the second charge data related to a second charge session for charging a second energy asset 114. In block 654, the first charge data and the second charge data may be converted into a common protocol. In block 656, a first session entry may be created for the first charge session and a second session entry may be created for the second charge session. In block 658, the first session entry and the second session entry may be sent to the cloud environment 104 via a wide area network, such as network 100. In block 660, at least a portion of the first session entry and the second session entry may be received. An additional request may be communicated with database server 220 to access additional session data. In block 662, a charge curve (such as via cost calculator 222) associated with the first charge session and the second charge session may be solved to determine a first charge to the first energy asset for usage of the first charging station and a second charge of the second energy asset 114 for usage of the second charging station 112.

In block 664, data related to the charge curve may be sent to the edge cluster 208. The data related to the charge curve may include at least one of the following: current delivered over time, total energy delivered, power delivered over time, voltage at the first charging station over time, and charging station state. In block 668, error data may be received from the first charging station 112. In block 670, pricing data may be accessed from the cloud environment 104 and costs incurred may be calculated, based on at least one of the following: delivered energy, expected costs prior to charging, idle time interval, and/or parking time interval. In block 672, a determination is made regarding whether a connection with the cloud environment 104 is established via a wide area network, such as network 100. In block 674, in response to determining that the connection with the cloud environment 104 is established, data received may be communicated to the cloud environment 104 via the network 100. In block 676, in response to determining that the connection with the cloud environment 104 is not established, unsent data in an may be stored in the edge environment 102 until the connection is established.

Figure 7:
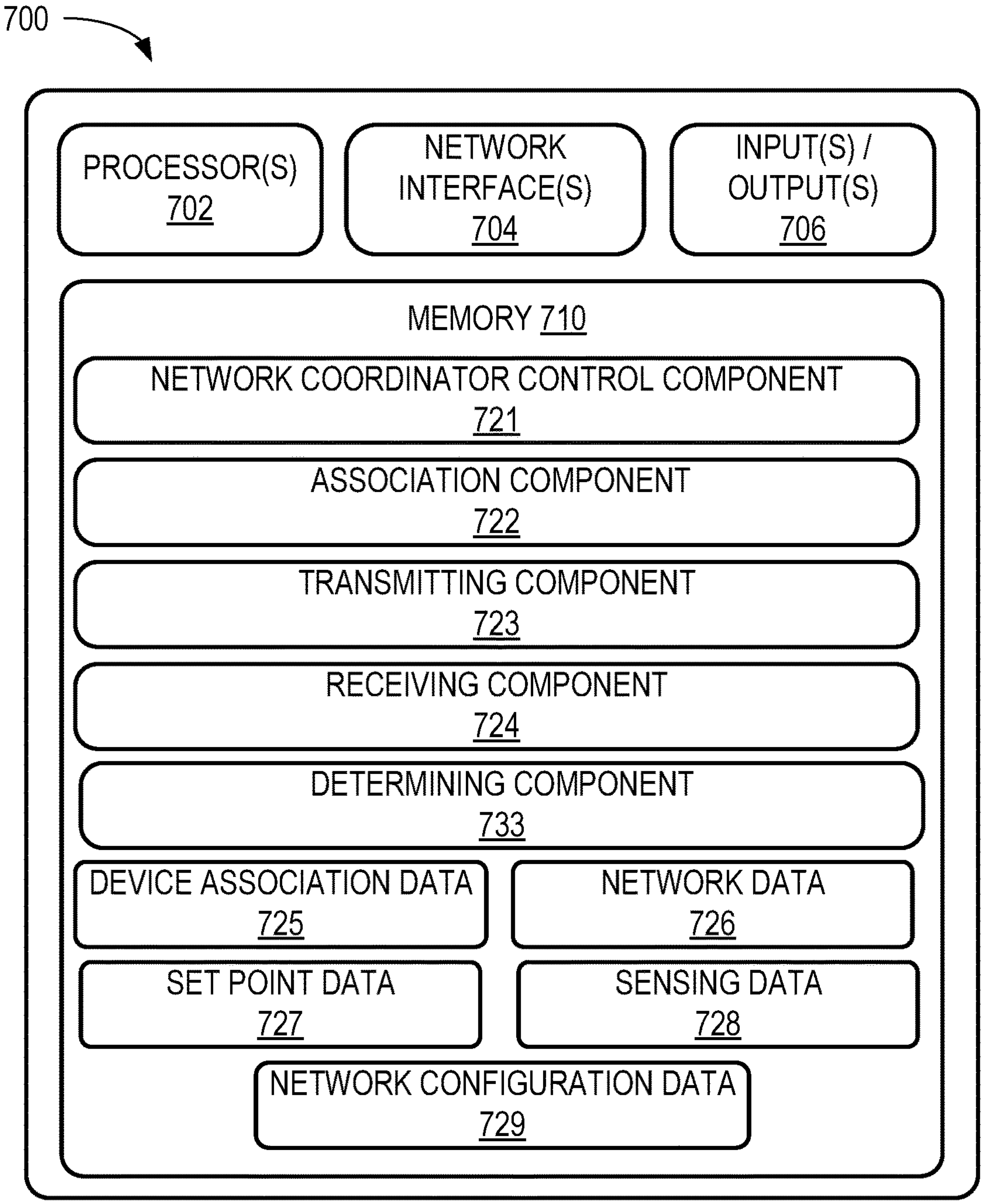
FIG. 7 depicts an example processing system configured to perform the methods described herein.

Example Processing System for Extending Network Coordination of Short-Range Networks to Remote Devices FIG. 7 depicts an example processing system 700 configured to perform the methods described herein.

Processing system 700 includes one or more processors 702. Generally, a processor 702 is configured to execute computer-executable instructions (e.g., software code) to perform various functions, as described herein.

Processing system 700 further includes a network interface 704, which generally provides data access to any sort of data network, including personal area networks (PANs), local area networks (LANs), wide area networks (WANs), the Internet, and the like.

Processing system 700 further includes input(s) and output(s) 706, which generally provide means for providing data to and from processing system 700, such as via connection to computing device peripherals, including user interface peripherals.

Processing system 700 further includes a memory 710 comprising various components. In this example, memory 710 includes a network coordinator control component 721, an association component 722, a transmitting component 723, a receiving component 724, a determining component 733, device association data 725, network data 726, set point data 727, sensing data 728, and network configuration data 729.

Processing system 700 may be implemented in various ways. For example, processing system 700 may be implemented as a computing device 402 within core device 302, described above with respect to FIGS. 3 and 4. Note that in various implementations, aspects may be omitted, added, or substituted from processing system 700.

Example Clauses

Implementation examples are described in the following numbered clauses:

Clause 1: A system for providing an electric vehicle (EV) computing platform, comprising: an edge environment located at a site that includes a processor and a memory component, the memory component storing an edge cluster, an edge gateway, an edge session broker, and a database server, that, when executed by the processor, causes the system to perform actions that include: receiving first charge data from the edge gateway, the first charge data being sent in a first communication protocol from a first charging station at the site, the first charge data related to a first charge session for charging a first energy asset; receiving second charge data from the edge gateway, the second charge data being sent in a second communication protocol from a second charging station, the second charge data related to a second charge session for charging a second energy asset; converting the first charge data and the second charge data into a common protocol; causing the edge cluster to create a first session entry for the first charge session and a second session entry for the second charge session; causing the edge cluster to send the first session entry and the second session entry to a cloud environment via a wide area network; causing the edge session broker to receive at least a portion of the first session entry and the second session entry and communicate with the database server to access additional session data; and causing the edge session broker to solve for a charge curve associated with the first charge session and the second charge session to determine a first charge to the first energy asset for usage of the first charging station and a second charge of the second energy asset for usage of the second charging station.

Clause 2: The system of clause 1, wherein the actions further include causing the edge session broker to send data related to the charge curve back to the edge cluster, wherein the data related to the charge curve includes at least one of the following: current delivered over time, total energy delivered, power delivered over time, voltage at the first charging station over time, and charging station state.

Clause 3: The system of clause 1 and/or 2, wherein the edge cluster receives error data from the first charging station.

Clause 4: The system of any of clauses 1 through 3, wherein the logic further includes a cost calculator, wherein the cost calculator accesses pricing data from the cloud environment and calculates costs incurred based on at least one of the following: delivered energy, expected costs prior to charging, idle time interval, and parking time interval.

Clause 5: The system of any of clauses 1 through 4, wherein the actions further include: determining whether a connection with the cloud environment via the wide area network is established; in response to determining that the connection with the cloud environment is established, communicating data received by the edge cluster to the cloud environment via the wide area network; and in response to determining that the connection with the cloud environment is not established, storing unsent data in the edge environment until the connection is established.

Clause 6: The system of any of clauses 1 through 5, wherein a user sends a request to claim the first charge session via a mobile device, wherein the mobile device connects with the cloud environment, wherein the cloud environment sends a message to the edge cluster with an instruction to claim the first charge session.

Clause 7: The system of any of clauses 1 through 6, wherein the first charge data includes at least one of the following: electric charging data, price charge data, and vehicle data from the first charging station, wherein the edge gateway abstracts the charge data to remove protocol specific distinctions.

Clause 8: The system of any of clauses 1 through 7, wherein the actions further include: converting the first charge into the first communication protocol; converting the second charge into the second communication protocol; sending the first charge to the first charging station; and sending the second charge to the second charging station.

Clause 9: A method for providing an electric vehicle (EV) computing platform, comprising: receiving first charge data, the first charge data being sent in a first communication protocol from a first charging station at a site, the first charge data related to a first charge session for charging a first energy asset; receiving second charge data, the second charge data being sent in a second communication protocol from a second charging station, the second charge data related to a second charge session for charging a second energy asset; converting the first charge data and the second charge data into a common protocol; causing an edge cluster to create a first session entry for the first charge session and a second session entry for the second charge session; causing the edge cluster to send the first session entry and the second session entry to a cloud environment via a wide area network; causing an edge session broker to receive at least a portion of the first session entry and the second session entry and communicate with a database server to access additional session data; and causing the edge session broker to solve for a charge curve associated with the first charge session and the second charge session to determine a first charge to the first energy asset for usage of the first charging station and a second charge of the second energy asset for usage of the second charging station.

Clause 10: The method of clause 9, further comprising causing the edge session broker to send data related to the charge curve back to the edge cluster, wherein the data related to the charge curve includes at least one of the following: current delivered over time, total energy delivered, power delivered over time, voltage at the first charging station over time, and charging station state.

Clause 11: The method of clause 9 and/or 10, further comprising receiving error data by the edge cluster from the first charging station.

Clause 12: The method of any of clauses 9 through 11, further comprising: accessing, via a cost calculator, pricing data from the cloud environment; and calculating, via the cost calculator, costs incurred based on at least one of the following: delivered energy, expected costs prior to charging, idle time interval, and parking time interval.

Clause 13: The method of any of clauses 9 through 12, further comprising: determining whether a connection with the cloud environment via the wide area network is established; in response to determining that the connection with the cloud environment is established, communicating data received by the edge cluster to the cloud environment via the wide area network; and in response to determining that the connection with the cloud environment is not established, storing unsent data in an edge environment until the connection is established.

Clause 14: The method of any of clauses 9 through 13, wherein a user sends a request to claim the first charge session via a mobile device, wherein the mobile device connects with the cloud environment, wherein the cloud environment sends a message to the edge cluster with an instruction to claim the first charge session.

Clause 15: The method of any of clauses 9 through 14, wherein the first charge data includes at least one of the following: electric charging data, price charge data, and vehicle data from the first charging station, wherein the edge gateway abstracts the charge data to remove protocol specific distinctions.

Clause 16: A non-transitory computer-readable medium comprising computer-executable instructions that, when executed by a processor of a processing system, cause the processing system to perform at least the following: receive first charge data, the first charge data being sent in a first communication protocol from a first charging station at a site, the first charge data related to a first charge session for charging a first energy asset; receive second charge data, the second charge data being sent in a second communication protocol from a second charging station, the second charge data related to a second charge session for charging a second energy asset; convert the first charge data and the second charge data into a common protocol; cause an edge cluster to create a first session entry for the first charge session and a second session entry for the second charge session; cause the edge cluster to send the first session entry and the second session entry to a cloud environment via a wide area network; cause an edge session broker to receive at least a portion of the first session entry and the second session entry and communicate with a database server to access additional session data; and cause the edge session broker to solve for a charge curve associated with the first charge session and the second charge session to determine a first charge to the first energy asset for usage of the first charging station and a second charge of the second energy asset for usage of the second charging station.

Clause 17: The non-transitory computer-readable medium of clause 16, wherein the instructions further cause the processing system to cause the edge session broker to send data related to the charge curve back to the edge cluster, wherein the data related to the charge curve includes at least one of the following: current delivered over time, total energy delivered, power delivered over time, voltage at the first charging station over time, and charging station state.

Clause 18: The non-transitory computer-readable medium of clause 16 and/or 17, wherein the logic further includes a cost calculator, wherein the cost calculator accesses pricing data from the cloud environment and calculates costs incurred based on at least one of the following: delivered energy, expected costs prior to charging, idle time interval, and parking time interval.

Clause 19: The non-transitory computer-readable medium of any of clauses 16 through 18, wherein the logic further causes the processing system to perform at least the following: determine whether a connection with the cloud environment via the wide area network is established; in response to determining that the connection with the cloud environment is established, communicate data received by the edge cluster to the cloud environment via the wide area network; and in response to determining that the connection with the cloud environment is not established, store unsent data in an edge environment until the connection is established.

Clause 20: The non-transitory computer-readable medium of any of clauses 16 through 19, wherein the first charge data includes at least one of the following: electric charging data, price charge data, and vehicle data from the first charging station, wherein the edge gateway abstracts the charge data to remove protocol specific distinctions.

Clause 20: A processing system, comprising: a memory comprising computer-executable instructions; and a processor configured to execute the computer-executable instructions and cause the processing system to perform a method in accordance with any one of Clauses 9-15.

Clause 21: A processing system, comprising means for performing a method in accordance with any one of Clauses 1-8.

Clause 20: A non-transitory computer-readable medium comprising computer-executable instructions that, when executed by a processor of a processing system, cause the processing system to perform a method in accordance with any one of Clauses 9-15.

Clause 21: A computer program product embodied on a computer-readable storage medium comprising code for performing a method in accordance with any one of Clauses 9-15.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) (logic) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system for providing an electric vehicle (EV) computing platform, comprising:

an edge environment, located at a site that includes a processor and a memory component, the memory component storing an edge cluster, an edge gateway, an edge session broker, and a database server, that, when executed by the processor, causes the system to perform actions that include:

receiving first charge data from the edge gateway, the first charge data being sent in a first communication protocol from a first charging station at the site, the first charge data related to a first charge session for charging a first energy asset;

receiving second charge data from the edge gateway, the second charge data being sent in a second communication protocol from a second charging station, the second charge data related to a second charge session for charging a second energy asset;

converting the first charge data and the second charge data into a common protocol;

causing the edge cluster to create: a first session entry for the first charge session, and a second session entry for the second charge session;

causing the edge cluster to send the first session entry and the second session entry to a cloud environment via a wide area network;

causing the edge session broker to receive at least a portion of the first session entry and the second session entry and to communicate with the database server to access additional session data; and causing the edge session broker to solve for a charge curve associated with the first charge session and the second charge session to determine: a first charge to the first energy asset for usage of the first charging station, and a second charge of the second energy asset for usage of the second charging station.

2. The system of claim 1, wherein the actions further include causing the edge session broker to send data related to the charge curve back to the edge cluster, wherein the data related to the charge curve includes at least one of: current delivered over time, total energy delivered, power delivered over time, voltage at the first charging station over time, or charging station state.

3. The system of claim 1, wherein the edge cluster receives error data from the first charging station.

4. The system of claim 1, wherein the memory component further stores a cost calculator, wherein the cost calculator accesses pricing data from the cloud environment and calculates costs incurred based on at least one of: delivered energy, expected costs prior to charging, idle time interval, or parking time interval.

5. The system of claim 1, wherein the actions further include:

determining whether a connection with the cloud environment via the wide area network is established; and in response to determining that the connection with the cloud environment is established, communicating data received by the edge cluster to the cloud environment via the wide area network, or in response to determining that the connection with the cloud environment is not established, storing unsent data in the edge environment until the connection is established.

6. The system of claim 1, wherein the actions further include receiving a request from a user to claim the first charge session via a mobile device, wherein the mobile device connects with the cloud environment, wherein the cloud environment sends a message to the edge cluster with an instruction to claim the first charge session.

7. The system of claim 1, wherein the first charge data includes at least one of: electric charging data, price charge data, or vehicle data from the first charging station, wherein the edge gateway abstracts the first charge data to remove protocol specific distinctions.

8. The system of claim 1, wherein the actions further include:

converting the first charge into the first communication protocol;

converting the second charge into the second communication protocol;

sending the first charge to the first charging station; and sending the second charge to the second charging station.

9. A method for providing an electric vehicle (EV) computing platform, comprising:

receiving first charge data, the first charge data being sent in a first communication protocol from a first charging station at a site, the first charge data related to a first charge session for charging a first energy asset;

receiving second charge data, the second charge data being sent in a second communication protocol from a second charging station, the second charge data related to a second charge session for charging a second energy asset;

converting the first charge data and the second charge data into a common protocol;

causing an edge cluster to create: a first session entry for the first charge session, and a second session entry for the second charge session;

causing the edge cluster to send the first session entry and the second session entry to a cloud environment via a wide area network;

causing an edge session broker to receive at least a portion of the first session entry and the second session entry and to communicate with a database server to access additional session data; and causing the edge session broker to solve for a charge curve associated with the first charge session and the second charge session to determine: a first charge to the first energy asset for usage of the first charging station, and a second charge to the second energy asset for usage of the second charging station.

10. The method of claim 9, further comprising causing the edge session broker to send data related to the charge curve back to the edge cluster, wherein the data related to the charge curve includes at least one of: current delivered over time, total energy delivered, power delivered over time, voltage at the first charging station over time, or charging station state.

11. The method of claim 9, further comprising receiving error data by the edge cluster from the first charging station.

12. The method of claim 9, further comprising:

accessing, via a cost calculator, pricing data from the cloud environment; and calculating, via the cost calculator, costs incurred based on at least one of: delivered energy, expected costs prior to charging, idle time interval, or parking time interval.

13. The method of claim 9, further comprising:

determining whether a connection with the cloud environment via the wide area network is established; and in response to determining that the connection with the cloud environment is established, communicating data received by the edge cluster to the cloud environment via the wide area network, or in response to determining that the connection with the cloud environment is not established, storing unsent data in an edge environment until the connection is established.

14. The method of claim 9, further comprising receiving a request from a user to claim the first charge session via a mobile device, wherein the mobile device connects with the cloud environment, wherein the cloud environment sends a message to the edge cluster with an instruction to claim the first charge session.

15. The method of claim 9, wherein the first charge data includes at least one of: electric charging data, price charge data, or vehicle data from the first charging station, wherein the method further comprises causing an edge gateway to abstract the first charge data to remove protocol specific distinctions.

16. A non-transitory computer-readable medium comprising computer-executable instructions that, when executed by a processor of a processing system, cause the processing system to:

receive first charge data, the first charge data being sent in a first communication protocol from a first charging station at a site, the first charge data related to a first charge session for charging a first energy asset;

receive second charge data, the second charge data being sent in a second communication protocol from a second charging station, the second charge data related to a second charge session for charging a second energy asset;

convert the first charge data and the second charge data into a common protocol;

cause an edge cluster to create: a first session entry for the first charge session and a second session entry for the second charge session;

cause the edge cluster to send the first session entry and the second session entry to a cloud environment via a wide area network;

cause an edge session broker to receive at least a portion of the first session entry and the second session entry and to communicate with a database server to access additional session data; and cause the edge session broker to solve for a charge curve associated with the first charge session and the second charge session to determine: a first charge to the first energy asset for usage of the first charging station, and a second charge of the second energy asset for usage of the second charging station.

17. The non-transitory computer-readable medium of claim 16, wherein the computer-executable instructions further cause the processing system to cause the edge session broker to send data related to the charge curve back to the edge cluster, wherein the data related to the charge curve includes at least one of: current delivered over time, total energy delivered, power delivered over time, voltage at the first charging station over time, or charging station state.

18. The non-transitory computer-readable medium of claim 16, wherein the computer-executable instructions further cause the processing system to cause a cost calculator to access pricing data from the cloud environment and to calculate costs incurred based on at least one of: delivered energy, expected costs prior to charging, idle time interval, or parking time interval.

19. The non-transitory computer-readable medium of claim 16, wherein the computer-executable instructions further cause the processing system to:

determine whether a connection with the cloud environment via the wide area network is established; and in response to determining that the connection with the cloud environment is established, communicate data received by the edge cluster to the cloud environment via the wide area network, or in response to determining that the connection with the cloud environment is not established, store unsent data in an edge environment until the connection is established.

20. The non-transitory computer-readable medium of claim 16, wherein the first charge data includes at least one of: electric charging data, price charge data, or vehicle data from the first charging station, wherein the computer-executable instructions further cause the processing system to cause an edge gateway to abstract the first charge data to remove protocol specific distinctions.

* * * * *